3,025,175
CERAMIC MATERIALS
Francis Henry Aldred, Warlingham, England, assignor to The Morgan Crucible Company Limited, London, England, a company of Great Britain
No Drawing. Filed Jan. 29, 1953, Ser. No. 334,069
Claims priority, application Great Britain Feb. 1, 1952
16 Claims. (Cl. 106—57)

This invention has for its object to produce ceramic materials having an improved resistance to thermal shock, i.e. to the effects of rapid temperature changes, at any temperature, whilst retaining a satisfactory strength (at both brief and prolonged loading) at high temperatures.

High quality refractory materials of the type consisting of crystalline grains bonded by a glassy matrix have good resistance to thermal shock at elevated temperatures but have poor strength particularly when subjected to prolonged loading at high temperatures. An example of such refractory material is high temperature porcelain, prepared, for example, from calcined kyanite and clay. When this is fired at a high temperature there is obtained a product consisting of mullite crystals embedded in a glass.

On the other hand, there are refractory materials which are wholly crystalline. An example is recrystallized alumina prepared, for instance, by incorporating with calcined alumina of high purity, fine enough to pass completely through a B.S.S. 300 mesh screen, a small amount of a temporary binder, pressing the composition to the required shape and subsequently firing it at a high temperature. The resultant product consists wholly of small crystals of alumina. These crystalline ceramic materials possess high strength but lack good thermal shock resistance.

The object of the present invention is achieved by a new type of ceramic material which, in the fired state is characterised in that it has a matrix which is composed substantially wholly of relatively small crystals of refractory material hereinafter called the matrix material, and that there is embedded in the matrix relatively large grains or crystals of other refractory material hereinafter called a coarse additive.

Good results are obtained with various relative proportions of the matrix material and the coarse additive. We have not found that there are precise or critical proportions giving outstanding results. Experiments have shown that for particular starting materials and grain sizes there is quite a wide range of relative proportions within which closely comparable results are obtained. However, we may give as a general indication of the range of proportions suitable for practical purposes, that the amount of the coarse additive may be from 10% to 50% by volume of the whole body with a preference of about 15% to 40%.

Various substances may be used as the matrix materials and the coarse additives. For example, the matrix materials may be alumina and the coarse additive therewith may be fused silica, mullite, stabilised zirconia, molochite (calcined china clay) or calcined kyanite. The roles may be reversed so that, for example, the matrix material is calcined kyanite and the coarse additive is alumina. It will, of course, be understood to be in accordance with the invention to employ a mixture of different refractory materials for the matrix and/or for the additive.

It is to be understood that "volume" means the sum of the volumes of all the particles and therefore does not denote the bulk volume which would include the unoccupied air space.

In producing a ceramic body according to the invention an intimate admixture of relatively fine grains of the matrix material and relatively coarse grains of the additive material is formed to the desired shape by customary methods. The body is then fired at a temperature and for a period of time which is sufficient to produce sintering but is not high enough to produce a substantial amount of glass or a substantial reaction between the respective materials.

It is preferred that the matrix material which is employed in the composition to be fired shall be so fine that it will all, or substantially all, pass through a screen of B.S.S. (British Standards Specification) 300 mesh (300 meshes to the linear inch). On the other hand it is preferred that the coarse additive shall be such that substantially none of it will pass through a B.S.S. 300 mesh screen. A coarse additive of B.S.S. 120/200 or 120/170 mesh particle size (i.e. which will all pass through a B.S.S. 120 mesh screen but will all stay on a B.S.S. 200 mesh screen) is generally suitable. A still coarser additive of B.S.S. 85/120 mesh particle size is quite satisfactory. Much coarser additives, say of B.S.S. 44/85 or 22/44 mesh particle size, may be used but is should be mentioned that the coarser the particle size of the additive, the less strong will be the fired product under normal conditions but there will still be good resistance to thermal shock. A more varied particle size such as B.S.S. 120/300 mesh may be used, but a B.S.S. 120/200 or 120/170 mesh particle size is preferred when high initial strength is desired. The firing temperature may vary according to the size and/or shape of the article to be produced, the material being fired, and the duration of firing; firing may be performed at temperatures ranging from 1300° C. to 1800° C.

There will now be given particulars of some tests using various matrix materials and additives, various relative proportions and various particle sizes thereof.

In these particulars we will use to denote particle sizes the abbraviations 300 mesh, 200 mesh etc., to denote that all the particles pass through a B.S.S. 300 mesh screen or 200 mesh screen etc., and 120/170 mesh, 44/85 mesh etc. to denote that all the particles pass through a B.S.S. 120 mesh screen but stay on a B.S.S. 170 mesh screen or pass through a B.S.S. 44 mesh screen but stay on a B.S.S. 85 mesh screen etc. The figures of transverse breaking strength given in the following particulars were determined at room temperature by supporting test pieces (approximately 4" x ½" x ¼") with their middle dimension resting on two knife edges 3" apart and applying an increasing load to a third knife edge located at the centre of the span until failure occurred. The resistance to thermal shock is indicated by the percentage of the transverse breaking strength remaining after the shock. The shock applied in the tests was a sudden quench in water at room temperature of specimens heated to 500° C.:

TABLE 1

Effects of Various Additives With Alumina Matrix
FIRING TEMPERATURE 1700° C.

| Matrix Material, 300 mesh mesh 74% by volume | Additive, 120/200 mesh 26% volume | Transverse Breaking Strength (lbs/sq. in) | Percent Strength remaining after thermal shock, 500° C.— water |
|---|---|---|---|
| Alumina | | 15,500 | 49 |
| Do | Fused silica | 5,100 | 100 |
| Do | Mullite | 7,100 | 100 |
| Do | Stabilised Zirconia | 11,300 | 73 |
| Do | Molochite | 8,100 | 83 |
| Do | Calcined Kyanite | 12,800 | 89 |
| Do | Uncalcined Kyanite | 5,600 | 100 |

It will be seen from these figures that although the initial strength is lower when the coarse additive is present, the percentage strength remaining after thermal shock is substantially higher than in the case where no coarse additive is present. This shows that the ceramic material is less damaged by thermal shock when it contains the coarser additive.

TABLE 2
*Use of Alumina as Additive With Kyanite Matrix*
FIRING TEMPERATURE 1700° C.

| Matrix Material, 300 mesh mesh 74% by volume | Additive, 120/200 mesh 26% volume | Transverse Breaking Strength (lbs/sq. in) | Percent Strength remaining after thermal shock, 500° C.—water |
|---|---|---|---|
| Calcined kyanite | | 14,500 | 29 |
| Do | Fused alumina | 5,900 | 74 |

In this case microscopic examination revealed that though the matrix was substantially of crystalline mullite, a small quantity of glass was present in it.

TABLE 3
*Effect of Size of Additive*
FIRING TEMPERATURE 1700° C.

| Matrix Material, Alumina | Additive Molochite | Additive Volume | Transverse Breaking Strength (lbs/sq. in) | Percent strength remaining after thermal shock |
|---|---|---|---|---|
| 300 mesh | Nil | | 14,400 | 40 |
| Do | 300 mesh | 27 | 12,100 | 62 |
| Do | 120/170 | 27 | 8,610 | 90 |
| Do | 85/120 | 27 | 7,900 | 75 |
| Do | 22/44 | 27 | 3,280 | 93 |

TABLE 4
*Effect of Quantity of Additive*
FIRING TEMPERATURE 1700° C.

| Matrix Material Alumina 300 mesh percent volume | Additive Molochite 22/44 mesh percent volume | Transverse breaking strength (lbs/sq. in) | Percent Strength remaining after thermal shock 500° C.—water |
|---|---|---|---|
| 100 | | 14,400 | 40 |
| 86 | 14 | 6,600 | 61 |
| 79 | 21 | 3,400 | 81 |
| 73 | 27 | 3,250 | 82 |
| 67 | 33 | 3,400 | 82 |
| 61 | 39 | 3,600 | 82 |
| 50 | 50 | 4,070 | 73 |

TABLE 5
*Effect of Less Fine Alumina as Matrix Material*
FIRING TEMPERATURE 1700° C.

| Matrix Material | Additive | Percent Additive volume | Transverse breaking strength (lbs/sq. in) | Percent Strength remaining after thermal shock 500° C.—water |
|---|---|---|---|---|
| Alumina, 100 mesh | nil | | 10,800 | 69 |
| Do | Molochite 22/44 mesh. | 27 | 5,670 | 90 |
| Alumina, 200 mesh | nil | | 1,740 | 55 |
| Do | Calcined kyanite 85/120 mesh | 24 | 4,590 | 74 |
| Alumina, 120 mesh | nil | | 1,510 | 58 |
| Do | Calcined kyanite 44/85 mesh. | 24 | 3,380 | 77 |

TABLE 6
*Relatively Coarse Bauxite as Matrix Material*
FIRING TEMPERATURE 1500° C.

| Matrix Material | Additive | Percent Additive volume | Transverse breaking strength (lbs/sq. in) | Percent Strength remaining after thermal shock 500° C.—water |
|---|---|---|---|---|
| Bauxite 44 mesh | nil | | 3,730 | 48 |
| Do | Molochite 22/44 mesh. | 10 | 2,660 | 57 |
| Do | do | 19 | 2,610 | 58 |
| Do | do | 29 | 700 | 73 |

TABLE 7
*Effect of Using a Mixture of Materials as Additive*
FIRING TEMPERATURE 1700° C.

| Matrix Material | Additive | Percent Additive volume | Transverse breaking strength (lbs/sq. in) | Percent Strength remaining after thermal shock 500° C.—water |
|---|---|---|---|---|
| Alumina 300 mesh | Molochite 44/85 mesh plus (in equal parts). | 27 (total) | 3,890 | 73 |
| Do | Calcined kyanite 44/85 mesh. | | | |

TABLE 8
*Effect When Using a Mixture of Materials for the Matrix*
FIRING TEMPERATURE 1700° C.

| Matrix Material | Additive | Percent Additive volume | Transverse breaking strength (lbs/sq. in) | Percent Strength remaining after thermal shock 500° C.—water |
|---|---|---|---|---|
| Fused alumina 200 mesh 23%, plus. | Molochite 44/85 mesh. | 21 | 2,330 | 78 |
| Bauxite through 120 mesh 56%. | | | | |

TABLE 9
FIRING TEMPERATURE 1500° C.

| Matrix Material | Additive | Percent Additive volume | Transverse breaking strength (lbs/sq. in) | Percent Strength remaining after thermal shock 500° C.—water |
|---|---|---|---|---|
| Alumina 300 mesh | nil | | 4,900 | 20 |
| Do | Calcined kyanite 120/200 mesh. | 25 | 3,700 | 78 |
| Do | Molochite 44/85 mesh. | 27 | 2,090 | 82 |

So far as concerns the effect of prolonged loading at high temperatures on materials according to the invention, it may be stated that their behaviour is analogous to normal wholly crystalline refractories and is of a much higher order than that of the glass bonded type of refractory. The thermal shock resistance as compared with that of fine textured wholly crystalline material is, however, considerably increased as will have been noted.

I claim:

1. A fired substantially non-glass containing ceramic material characterized in that it has a matrix consisting substantially wholly of sintered crystals of a refractory material selected from the group consisting of alumina, bauxite, uncalcined kyanite, calcined kyanite, fused silica, mullite, stabilized zirconia and molochite, of particle size finer than 100 B.S.S. mesh, down to 300 B.S.S., and that there is embedded in said matrix a coarser additive consisting of grains of at least one other material different from the matrix material but selected from the above group of refractory materials, of particle size coarser than 200 B.S.S. mesh up to 22 B.S.S. mesh, the amount of coarser material being from 10 to 50% by volume of the whole material.

2. A ceramic material as set forth in claim 1 in which the amount of coarser material is from 15% to 40% by volume.

3. A ceramic material as set forth in claim 1 in which the matrix is alumina.

4. A ceramic material as set forth in claim 3 in which the coarser refractory is fused silica.

5. A ceramic material as set forth in claim 3 in which the coarser refractory is mullite.

6. A ceramic material as set forth in claim 3 in which the coarser refractory is stabilized zirconia.

7. A ceramic material as set forth in claim 3 in which the coarser refractory is molochite.

8. A ceramic material as set forth in claim 3 in which the coarser refractory is kyanite.

9. Process of producing a fired substantially non-glass containing ceramic material resistant to thermal shock by intimately mixing a refractory matrix material selected from the group consisting of alumina, bauxite, uncalcined kyanite, calcined kyanite, fused silica, mullite, stabilized zirconia and molochite, of particle size finer than 100 B.S.S., down to 300 B.S.S., with a coarser additive of at least one other material different from the matrix material but selected from the above group of refractory materials, of particle size coarser than 200 B.S.S. mesh up to 22 B.S.S. mesh, the amount of coarser material being from 10 to 50% by volume of the whole material, forming the mixture to a desired shape and firing the same to a temperature between 1300° C. and 1800° C. at which sintering of the matrix takes place with production of substantially no glass.

10. Process as set forth in claim 9 in which the coarser material is from 15% to 40%.

11. Process as set forth in claim 9 in which the matrix is alumina.

12. Process as set forth in claim 11 in which the coarser rerfactory is fused silica.

13. Process as set forth in claim 11 in which the coarser refractory is mullite.

14. Process as set forth in claim 11 in which the coarser refractory is stabilized zirconia.

15. Process as set forth in claim 11 in which the coarser refractory is molochite.

16. Process as set forth in claim 11 in which the coarser refractory is kyanite.

References Cited in the file of this patent

UNITED STATES PATENTS

| | | |
|---|---|---|
| 1,814,088 | Housman et al. | July 14, 1931 |
| 1,984,178 | Devers | Dec. 11, 1934 |
| 2,446,975 | Conley | Aug. 10, 1948 |

FOREIGN PATENTS

| | | |
|---|---|---|
| 370,435 | Great Britain | 1935 |
| 69 | Great Britain | 1908 |